US011199095B2

(12) United States Patent
Haller et al.

(10) Patent No.: US 11,199,095 B2
(45) Date of Patent: Dec. 14, 2021

(54) CONTROLLED FLOW TURBINE BLADES

(71) Applicant: General Electric Company, Schenectady, NY (US)

(72) Inventors: Brian Robert Haller, Rugby (GB); Ivan William Mcbean, Baden (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/072,745

(22) Filed: Oct. 16, 2020

(65) Prior Publication Data

US 2021/0222564 A1 Jul. 22, 2021

(30) Foreign Application Priority Data

Oct. 31, 2019 (EP) .................................... 19206667

(51) Int. Cl.
*F01D 5/14* (2006.01)
*F01D 5/22* (2006.01)

(52) U.S. Cl.
CPC ............. *F01D 5/141* (2013.01); *F01D 5/225* (2013.01); *F05D 2220/31* (2013.01); *F05D 2240/301* (2013.01); *F05D 2250/71* (2013.01)

(58) Field of Classification Search
None
See application file for complete search history.

(56) References Cited

U.S. PATENT DOCUMENTS 5,779,443 A * 7/1998 Haller ..................... F01D 5/145 415/191
2002/0197156 A1* 12/2002 Haller ..................... F01D 9/02 415/192
2003/0215330 A1* 11/2003 Haller ..................... F01D 5/141 415/191
2011/0123313 A1 5/2011 Blatchford et al.
2012/0027568 A1 2/2012 Haller
2012/0183411 A1* 7/2012 Haller ..................... F01D 9/041 416/243
2012/0189441 A1 7/2012 Haller et al.
2014/0369815 A1* 12/2014 Haller ..................... F01D 21/003 415/119
2016/0146013 A1 5/2016 Haller
2016/0230573 A1 8/2016 Haller
2019/0203609 A1 7/2019 Haller
2020/0011190 A1* 1/2020 Read ..................... B28B 1/001

* cited by examiner

*Primary Examiner* — Michael Lebentritt
(74) *Attorney, Agent, or Firm* — Eversheds Sutherland (US) LLP

(57) ABSTRACT

The present application provides a turbine blade. The turbine blade includes a root section with a first curved section, a tip section with a second curved section, and number of mean sections positioned between the root section and the tip section. The mean sections each include a substantially prismatic shape.

20 Claims, 4 Drawing Sheets

290
A
205
285
210
280
W
ψ
β
t
BSD
270
T
p

CONTROLLED FLOW TURBINE BLADES

TECHNICAL FIELD

The present application and the resultant patent relate generally to axial flow turbines such as steam turbines, gas turbines, and the like and more particularly relate to controlled flow turbine blades for use at higher aspect ratios for improved efficiency.

BACKGROUND

Generally described, steam turbines and the like may have a defined steam path that includes a steam inlet, a turbine section, and a steam outlet. Steam generally may flow through a number of turbine stages typically disposed in series, including first or control stage blades with guides and runners (or nozzles and buckets) and subsequent guides and runners of later stages of the steam turbine. In this manner, the guides may direct the steam toward the respective runners, causing the runners to rotate and drive a load, such as an electrical generator and the like. The steam may be contained by circumferential shrouds surrounding the runners, which also may aid in directing the steam along the path. In this manner, the turbine guides, runners, and shrouds may be subjected to high temperatures resulting from the steam, which may result in the formation of hot spots and high thermal stresses in these components. Because the efficiency of a steam turbine is dependent in part on its operating temperatures, there is an ongoing demand for components positioned along the steam or hot gas path to be capable of withstanding increasingly higher temperatures without failure or decrease in useful life. Of significance is improving overall operational flexibility and part-load performance.

Certain turbine blades may be formed with an airfoil geometry. The blades may be attached to tips and roots, where the roots are used to couple the blade to a disc or drum. Known turbine blades may have an airfoil cross-section of straight or "prismatic" form extending radially between the tip and the root. Orientations of both fixed and moving blades have been standardized for the prismatic blade design. Depending on the design, the turbine blade geometry and dimensions may result in certain profile losses, secondary losses, leakage losses, mixing losses, and the like that may affect efficiency and/or performance of the steam turbine or other type of axial flow device.

SUMMARY

The present application and the resultant patent thus provide a turbine blade. The turbine blade may include a root section with a first curved section, a tip section with a second curved section, and a number of mean sections positioned between the root section and the tip section. The mean sections each include a substantially prismatic shape.

The present application and the resultant patent further provide a steam turbine blade. The steam turbine blade may include a root section with a first curved section, a tip section with a second curved section, and a number of mean sections positioned between the root section and the tip section. The mean sections may include a substantially prismatic shape and a reduced axial width as compared to the first curved section and the second curved section.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
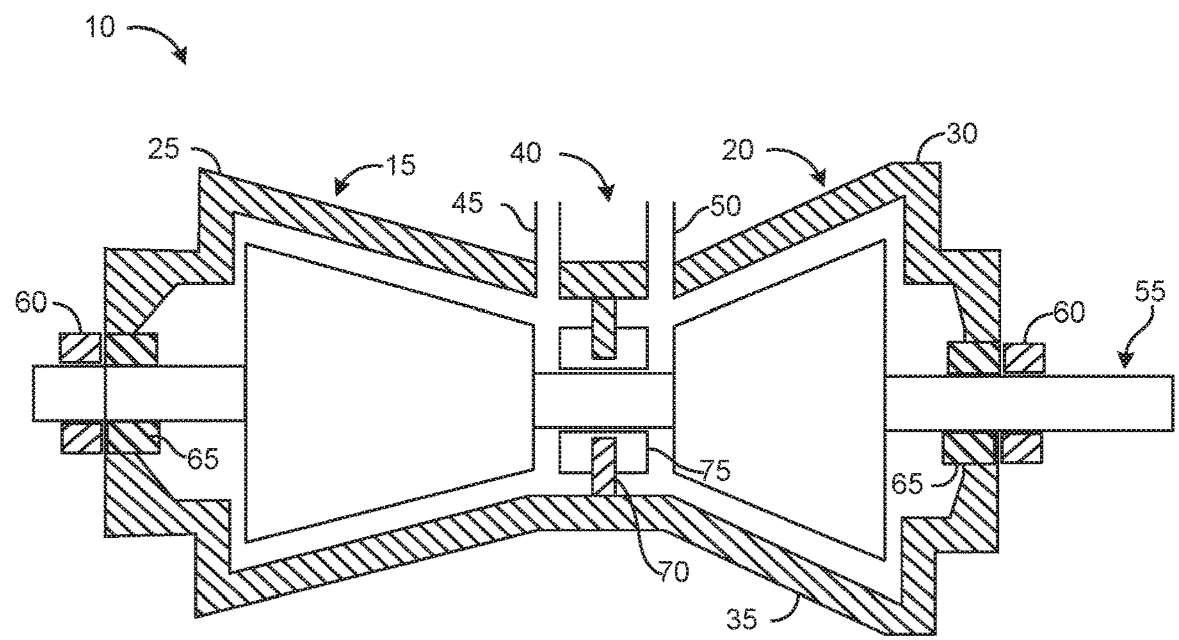
FIG. 1 is a schematic diagram of a steam turbine with a high pressure section and an intermediate pressure section.

Referring now to the drawings, in which like numerals refer to like elements throughout the several views, FIG. 1 shows a schematic diagram of an example of a steam turbine 10. Generally described, the steam turbine 10 may include a high pressure section 15 and an intermediate pressure section 20. Other pressures and other sections also may be used herein. An outer shell or casing 25 may be divided axially into an upper half section 30 and a lower half section 35. A central section 40 of the casing 25 may include a high pressure steam inlet 45 and an intermediate pressure steam inlet 50. Within the casing 25, the high pressure section 15 and the intermediate pressure section 20 may be arranged about a rotor or disc 55. The disc 55 may be supported by a number of bearings 60. A steam seal unit 65 may be located inboard of each of the bearings 60. An annular section divider 70 may extend radially inward from the central section 40 towards the disc 55. The divider 70 may include a number of packing casings 75. Other components and other configurations may be used.

During operation, the high pressure steam inlet 45 receives high pressure steam from a steam source. The steam may be routed through the high pressure section 15 such that work is extracted from the steam by rotation of the disc 55. The steam exits the high pressure section 15 and then may be returned to the steam source for reheating. The reheated steam then may be rerouted to the intermediate pressure section inlet 50. The steam may be returned to the intermediate pressure section 20 at a reduced pressure as compared to the steam entering the high pressure section 15 but at a temperature that is approximately equal to the temperature of the steam entering the high pressure section 15.

Figure 2:
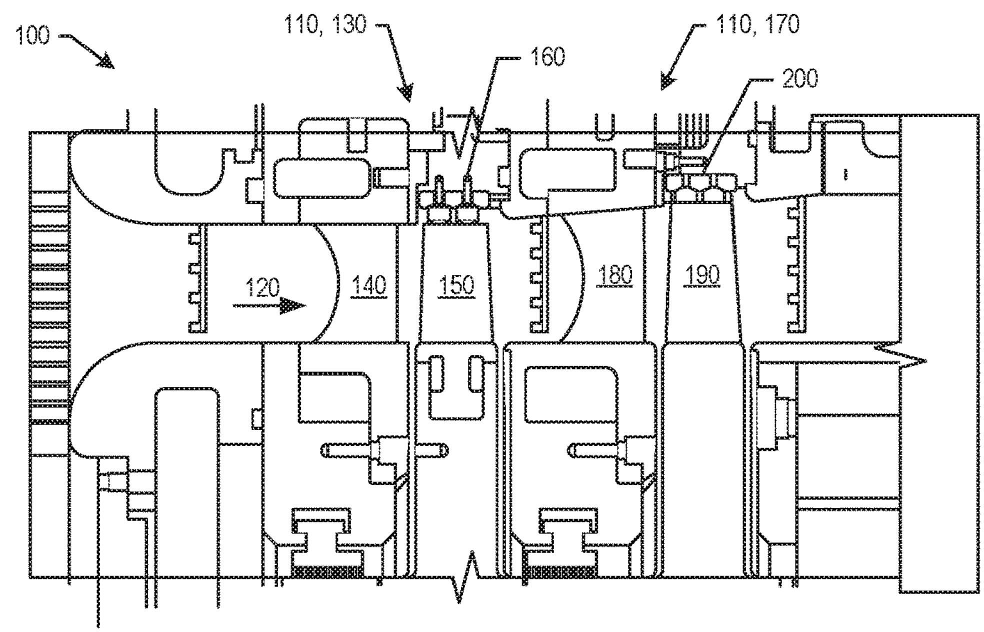
FIG. 2 is a schematic diagram of a portion of a steam turbine showing a number of stages with guide blades and runner blades.

FIG. 2 shows a schematic diagram of a portion of the steam turbine 100 including a number of stages 110 positioned in a steam or hot gas path 120. A first stage 130 may include a number of circumferentially-spaced first-stage controlled flow guides 140 and a number of circumferentially-spaced first-stage controlled flow runners 150. The first stage 130 may include a first-stage shroud 160 extending circumferentially and surrounding the first-stage controlled flow runners 150. The first-stage shroud 160 may include a number of shroud segments positioned adjacent one another in an annular arrangement. In a similar manner, a second stage 170 may include a number of second-stage controlled flow guides 180, a number of second-stage controlled flow runners 190, and a second-stage shroud 200 surrounding the second-stage controlled flow runners 190. The controlled flow guides and runners may have a Reaction Technology Blading (RTB) design and the like. The controlled flow guides and runners may be original equipment or part of a retrofit. Any number of stages with corresponding guides and runners may be included herein. Other embodiments may have different configurations.

Figure 3:
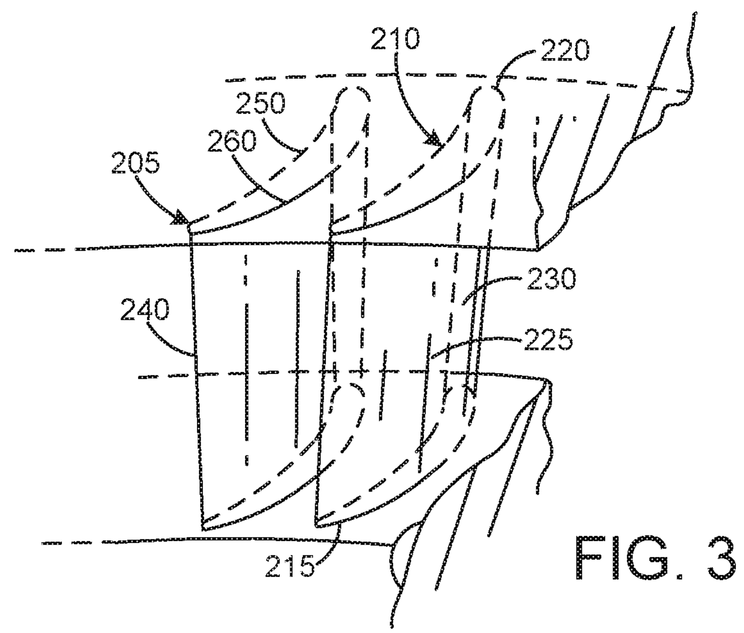
FIG. 3 is a partial perspective view of a pair of blades that have been conventionally used in the stages of FIG. 2.

FIG. 3 shows a pair of blades 205, 210 such as the controlled flow guide 140 shown in FIG. 2. The blades 205, 210 may be of the known straight or prismatic orientation. In other words, the blades 205, 210 are designed such that the notional airfoil sections, each considered orthogonal to a radial line from the rotor, may have the same shape from a blade root 215 to a blade tip 220 (and a mean section 225 in-between), are untwisted from the blade root 215 to the blade tip 220, and are stacked with a leading edge 230 and a trailing edge 240 each on a straight line. Each blade 205, 210 also has a concave pressure surface 250 and a convex suction surface 260.

Figure 5:
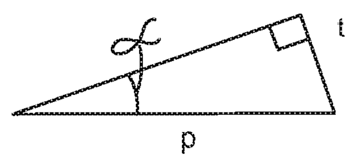
FIG. 5 shows the blade outlet angle $\alpha$ of the pair of blades of FIG. 3.

The following parameters related to the design of the blades 205, 210 will be described in detail herein. As is shown in FIG. 5, the "blade outlet angle α" of an airfoil blade is, for example, the angle, relative to the circumferential direction of the rotor, that the working fluid leaves a circumferential blade row and can be derived from the relationship:

$$\alpha = \sin^{-1} K \text{ where: } K = \text{throat dimension } (t)/\text{pitch dimension } (p).$$

Figure 4:
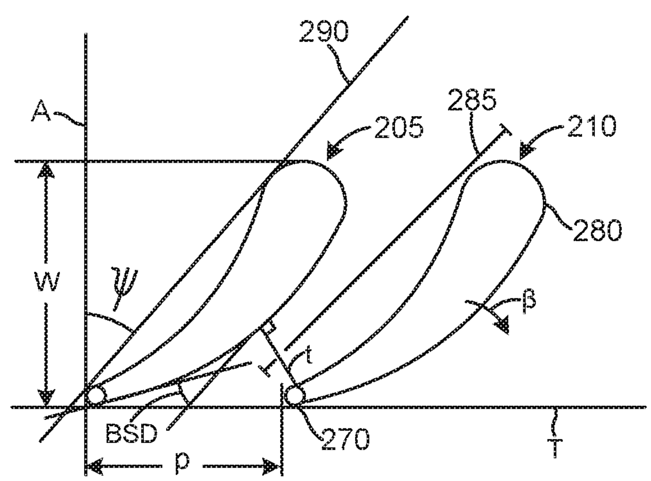
FIG. 4 is a plan view of the pair of blades of FIG. 3.

As is shown in FIG. 4, the "throat dimension (t)" is, for example, defined as the shortest line extending from one airfoil blade trailing edge 240 normal to a suction surface 260 of an adjacent airfoil blade in the same row. The "pitch dimension (p)", for example, is a circumferential distance from one airfoil blade trailing edge 240 to the adjacent airfoil blade trailing edge 240 in the same row at a specified radial distance from the platform region of the airfoil blade.

A "setting angle (β)" is, for example, an angle through which any particular airfoil section at a position along the height or span of the airfoil blade is displaced in its own plane from a predetermined zero datum. The datum, for example, can be taken at a radial location where the airfoil section has the same "stagger angle (Ψ)" as a known prismatic airfoil blade in a known turbine utilizing such airfoil blades. The stagger angle (Ψ) is, for example, the angle between an axis A of the turbine and a tangent line 290 touching a trailing edge circle 270 and a leading edge 280 of the airfoil section (as will be discussed in more detail below), and indicates an orientation of the airfoil section relative to the turbine axis A.

A "chord line" 285 is, for example, the shortest line tangent to leading 230 and trailing edge 240 radii of an airfoil section. The "chord length" is the distance between two lines normal to the chord line and passing through the points where the chord line touches the leading 230 and trailing edges 240 respectively. The "axial width" (W) of an airfoil blade is, for example, an axial distance between the leading 230 and trailing edges 240 (e.g., the distance between the leading and trailing edges as measured along the rotational axis A of the turbine). The "back surface deflection (BSD) angle" is, for example, a change in angle on an uncovered surface of the airfoil blade between a throat point and a trailing edge blend point on the suction surface.

An "aspect ratio" may define a ratio of the height to the width or the chord of the airfoil blade.

FIG. 4 shows a radial plan view of the orientation of the blades 205, 210 relative to the turbine axis A (the rotor 55) and a transverse (e.g., tangential or circumferential) plane T containing the casing 25 and to which the turbine axis A is perpendicular. The blade airfoil section is based on the small trailing edge circle 270 and the larger leading edge 280. A tangent line 290 to these two points defines the stagger angle Ψ from the turbine axis A direction. The larger leading edge 280 may have continuous curvature. The axial width (W) of these known fixed blades 205, 210 at a given radial position is the distance between the leading and trailing edges 230, 240 at the given radial position.

If a perpendicular line is drawn from the suction surface 260 of the blade 205 to meet the pressure surface 250 of the adjacent blade 210, and then if the shortest such line is taken, this is the throat dimension t, which occurs in the region of the trailing edge 240 of the blade 210. As described above and shown in FIG. 5, the ratio of this throat dimension (t) to the pitch dimension (p) of the fixed blades gives the value K, which is equal to the sine of the blade outlet angle (α), as previously defined. It can be seen that, approximately, this angle is the blade outlet angle from each blade relative to the transverse plane T.

Figure 6:
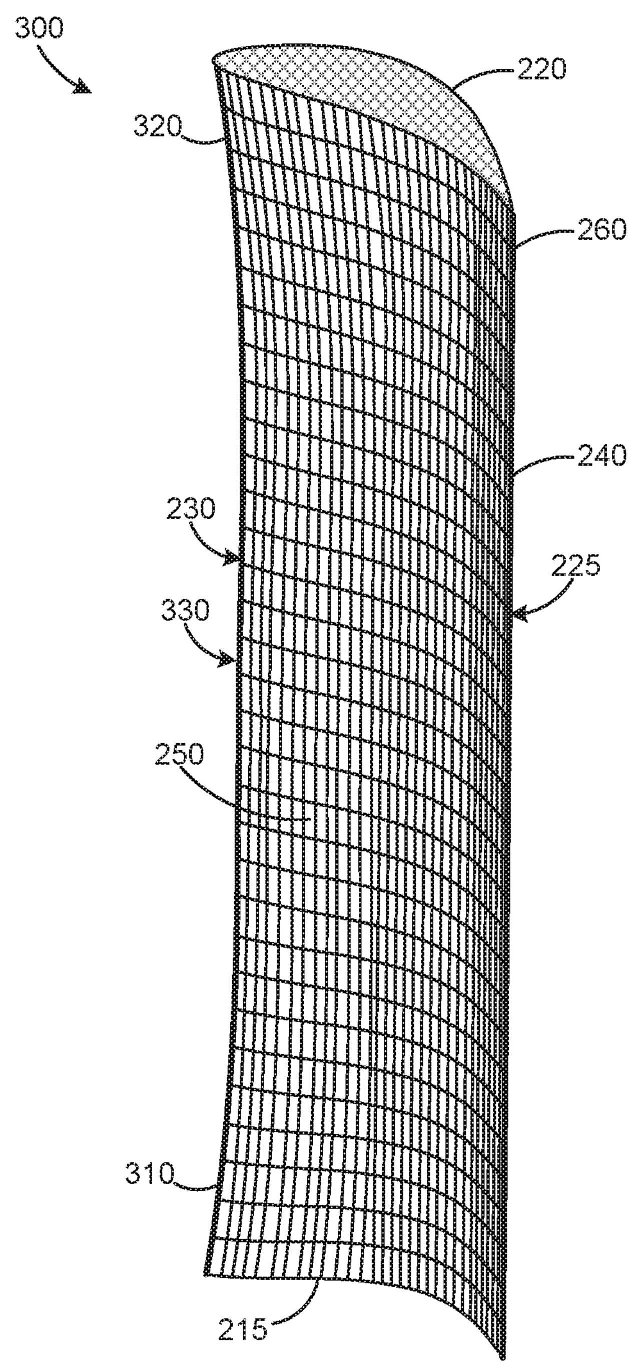
FIG. 6 is perspective view of a blade as may be described herein.

FIG. 6 shows an airfoil blade 300 as may be described herein. The airfoil blade 300 may accommodate stages with a greater height and, hence, a greater aspect ratio. The airfoil blade 300 may have a prismatic straight trailing edge 240 extending along the height of the blade 300. Instead of the three sections (the root 215, the tip 220, and the mean section 225) described above, the blade 300 may have the root section 215, the tip section 220, and any number of mean sections 225 therebetween. Specifically, the leading edge 230 may have a first curved controlled flow section 310 about the root section 215, a second curved controlled flow section 320 about the tip section 220, and any number of mean sections 225 with a straight or prismatic shape 330 in between for a "locally blended" region.

The term "curved" describes a surface having a change in the blade outlet angle (α) over a prescribed length, i.e., a "monotonically decreasing" angle. The curved controlled flow sections 310, 320 curve outward away from the mean sections 225 with the straight or prismatic shape 330 such that the mean sections 225 have a reduced axial width for improved lift while the wider curved controlled flow sections 310, 320 provide greater leading edge sweep. These sections 310, 320 may be combined with a relatively high back surface deflection angle along the pressure side 250 with modified controlled flow stacking along the trailing edge 240. The controlled flow section 310 may define a first decreasing blade outlet angle, the second controlled flow section 320 may define a second decreasing outlet angle, and the mean sections 225 may define a substantially constant blade outlet angle.

Figure 7:
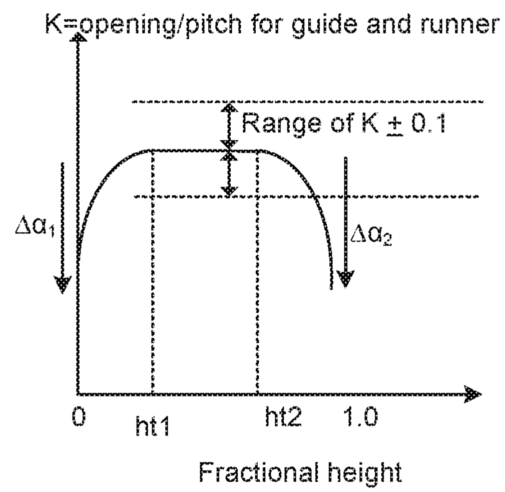
FIG. 7 is a chart showing the change in a ratio (K) of a throat dimension to a pitch dimension along the height of the blade of FIG. 6.
Figure 8:
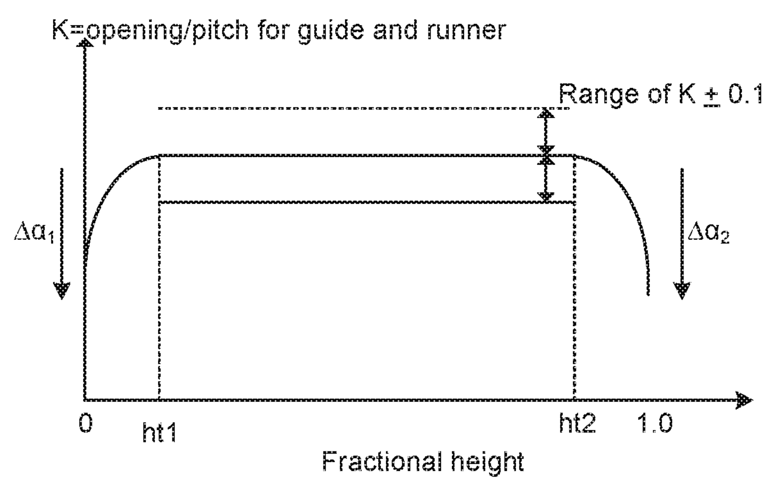
FIG. 8 is a chart showing the change in a ratio (K) of a throat dimension to a pitch dimension along the height of a similar blade.

The nature of the curved controlled flow sections 310, 320 may be shown in FIGS. 7 and 8, which plots the change in K (ratio of throat dimension (t) to the pitch dimension (p)) along the fractional height (ht) of the blade 300. From the root section 215 to a height $ht_1$ along the first curved controlled flow section 310, the reduction in the blade outlet angle (α) provides an increase in K. From the height ($ht_1$) to a height $ht_2$ along the mean sections 225 with the straight or prismatic shape 330, K may remain substantially stable, i.e., within a range of about ±0.1. From the height ($ht_2$) to the end of the tip section 220 of the second curved controlled flow section 320, the decrease in the blade outlet angle ($\alpha$) provides a similar decrease in K.

Generally speaking along the height of the blade 300 as is shown in FIG. 7, the height ($ht_1$) of the first curved section 310 is between about 0% and less than about 50% of the blade height (ht) ($0 \le ht_1 \le 0.5$) and the height ($ht_2$) of the second curved section 320 is between more than about 50% and 100% of the blade height (ht) ($0.5 \le ht_2 \le 1.0$) for smaller aspect ratios of about 1 to 2. In other blades as is shown in FIG. 8, the first curved section 310 extends from about 0% to about 15% of the blade height ($0 \le ht_1 \le 0.15$) and the second curved section 320 extends from about 85% and about 100% of the blade height ($0.85 \le ht_2 \le 1.0$) for higher aspect ratios (that is aspect ratios greater than about 2). In some blades, the aspect ratio may be from between about 1 to about 6. The heights $ht_1$ and $ht_2$ of the curved control sections 310, 320 may be the same or different with the height along the mean sections 225 varying.

Likewise, the change in the blade outlet angle ($\alpha$) may be about $2 \le \Delta\alpha_1 \le 8°$, and $2 \le \Delta\alpha_2 \le 8°$. Interestingly, the closing at the endwalls may be greater than the range of K ±0.1 along the straight or prismatic shape 330 of the mean sections 225, i.e., the change in K along the first curved controlled flow section 310 and the change in K along the second curved controlled flow section 320 are both greater than the range of K ±0.1 along the number of mean sections 225.

The airfoil blade 300 thus may accommodate aspect ratios from about 1 to about 6 or so for use in stages of greater height and may result in reduced profile and secondary loses. Specifically, the use of the mean sections 225 with the straight or prismatic shape 330 provides increased lift with lower profile losses due to the higher opening/pitch with high back surface deflection while the curved controlled flow sections 310, 320 with the forward leading edge sweep reduces overall secondary flow losses. Given such, the blade 300 has a more constant K distribution over most of the overall height (about 15% to about 85%) with only local controlled flow closing losses towards the endwalls. All of the sections have high aft loading to reduce further profile and secondary loses. The airfoil blade 300 thus may improve overall efficiency while reducing possible component damage and/or failure. Specifically, the improved airfoil blade 300 may improve overall efficiency with the easy ability to retrofit.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

The invention claimed is:

1. A turbine blade, comprising:
- a leading edge and a trailing edge;
- a root section comprising a first curved section;
- a tip section comprising a second curved section; and
- a plurality of mean sections positioned between the root section and the tip section, wherein each of the plurality of mean sections comprises a substantially prismatic shape about the leading edge and the trailing edge.

2. The turbine blade of claim 1, wherein the substantially prismatic shape comprises a ratio (K) of a throat dimension to a pitch dimension of K ±0.1.

3. The turbine blade of claim 1, wherein the plurality of mean sections comprises a reduced axial width as compared to the first curved section and the second curved section.

4. The turbine blade of claim 1, wherein the first curved section and the second curved section comprise an inward curve away from the plurality of mean sections.

5. The turbine blade of claim 1, wherein the first curved section comprises a first decreasing blade outlet angle, wherein the second curved section comprises a second decreasing blade outlet angle, and wherein the plurality of mean sections comprises a substantially constant blade outlet angle.

6. The turbine blade of claim 5, wherein the first decreasing blade outlet angle and the second decreasing blade outlet angle are less than the substantially constant blade outlet angle.

7. The turbine blade of claim 5, wherein the first decreasing blade outlet angle and the second decreasing blade outlet angle are between about two and eight degrees.

8. The turbine blade of claim 1, wherein the first curved section comprises a first ratio of a throat dimension to a pitch dimension, wherein the second curved section comprises a second ratio, and wherein the plurality of mean sections comprises a substantially constant ratio.

9. The turbine blade of claim 8, wherein the first ratio and the curved ratio are less than the substantially constant ratio.

10. The turbine blade of claim 8, wherein a first change in the first ratio along the first curved section and a second change in the second ratio along the second curved 15 section are greater than a mean change in the substantially constant ratio ±0.1 along the plurality of mean sections.

11. The turbine blade of claim 1, wherein the first curved section extends along a first height of the blade from about zero percent to about fifty percent of a total 20 height of the blade for an aspect ratio of about one to two.

12. The turbine blade of claim 1, wherein the second curved section extends along a second height of the blade from about fifty percent to about one hundred percent of a total height of the blade for an aspect ratio of about one to two.

13. The turbine blade of claim 1, wherein the first curved section extends along a first height of the blade from about zero percent to about fifteen percent of a total height of the blade for an aspect ratio of higher than about two.

14. The turbine blade of claim 1, wherein the second curved section extends along a second height of the blade from about eighty-five percent to about 100 percent of a total height of the blade for an aspect ratio of higher than about two.

15. The turbine blade of claim 1, comprising an aspect ratio of about one to six.

16. A steam turbine blade, comprising:
- a leading edge and a trailing edge;
- a root section comprising a first curved section;
- a tip section comprising a second curved section; and
- a plurality of mean sections positioned between the root section and the tip section, wherein the plurality of mean sections comprises a substantially prismatic shape about the leading edge and the trailing edge and a reduced axial width as compared to the first curved section and the second curved section.

17. The steam turbine blade of claim 16, wherein the substantially prismatic shape comprises a ratio (K) of a throat dimension to a pitch dimension of K ±0.1.

18. The steam turbine blade of claim 16, wherein the first curved section comprises a first decreasing blade outlet angle; wherein the second curved section comprises a second decreasing blade outlet angle; wherein the plurality of mean sections comprises a substantially constant blade outlet angle; and wherein the first decreasing blade outlet angle and the second decreasing blade outlet angle are less than the substantially constant blade outlet angle.

19. The steam turbine blade of claim 18, wherein the first decreasing blade outlet angle and the second decreasing blade outlet angle are between about two and eight degrees.

20. The steam turbine blade of claim 16, comprising an aspect ratio of about one to six.

* * * * *